F. S. SHIELDS.
RELIEVING MACHINE.
APPLICATION FILED JAN. 10, 1917.
1,396,292.
Patented Nov. 8, 1921.
5 SHEETS—SHEET 3.
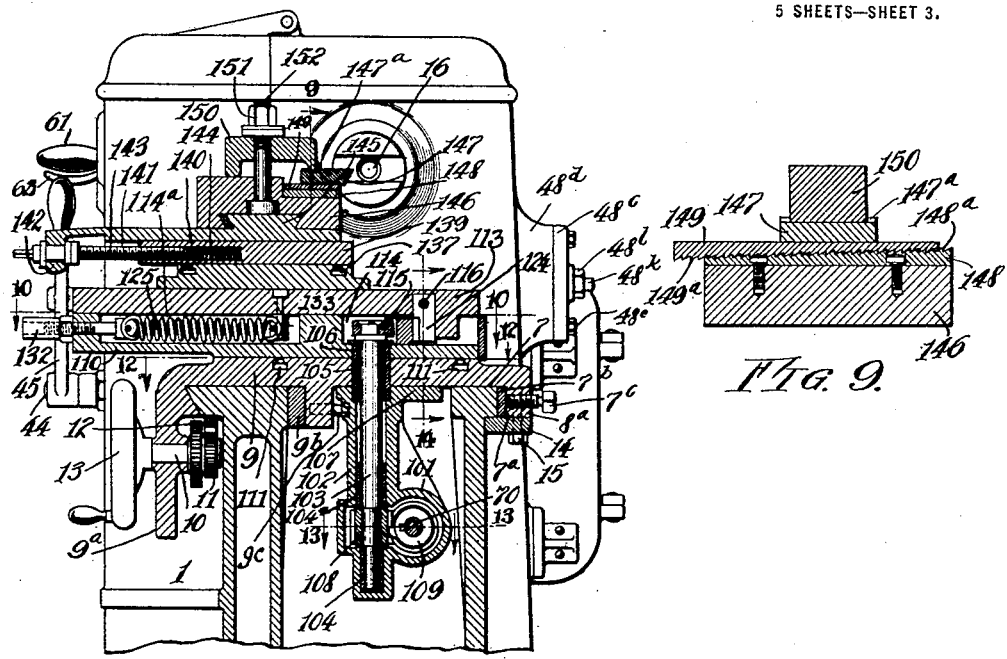
Fig. 5.
Fig. 9.
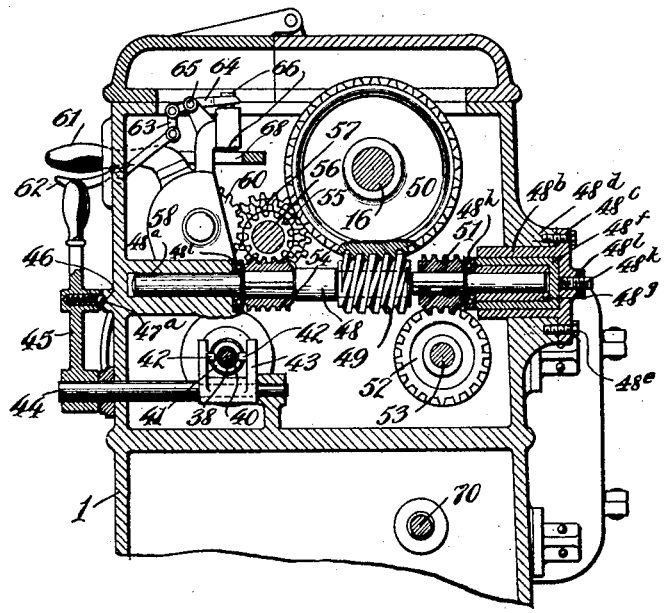
Fig. 6.
INVENTOR,
Frank S. Shields,
BY Hull, Smith, Brock & West.
ATT'YS.

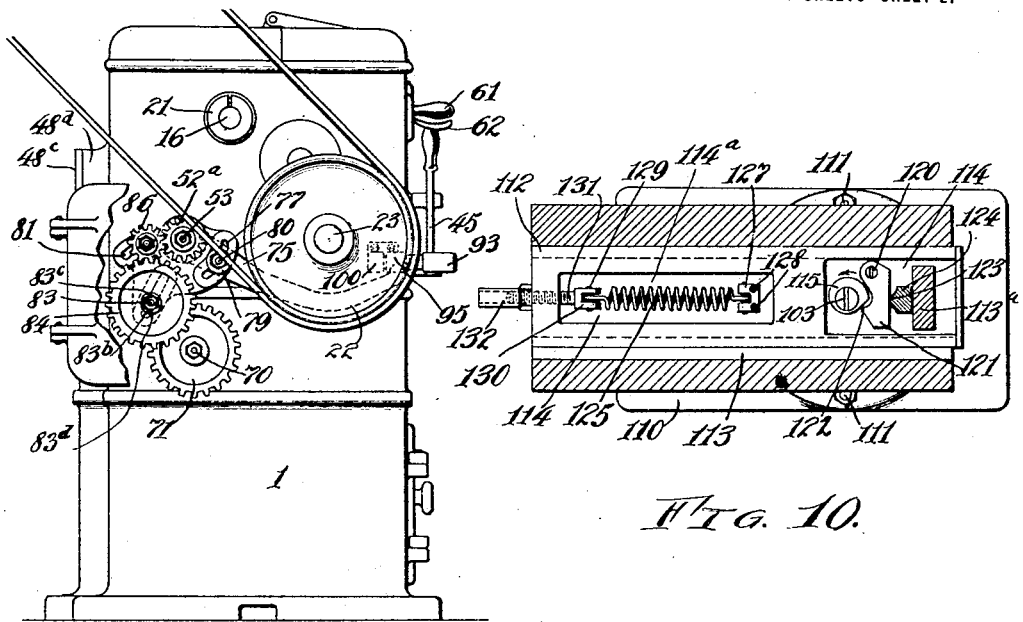
FIG. 3.
FIG. 10.
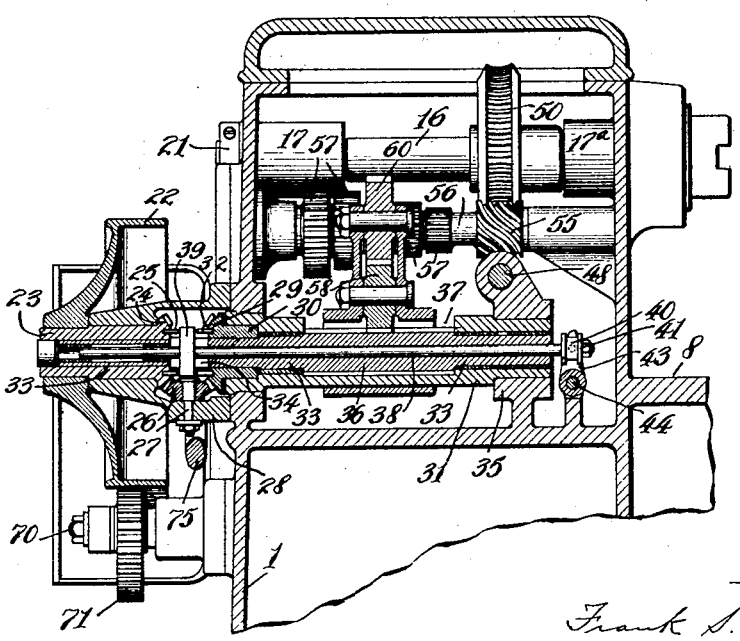
FIG. 4.
INVENTOR,
Frank S. Shields,
By Hull, Smith, Brock & West.
ATTYS.

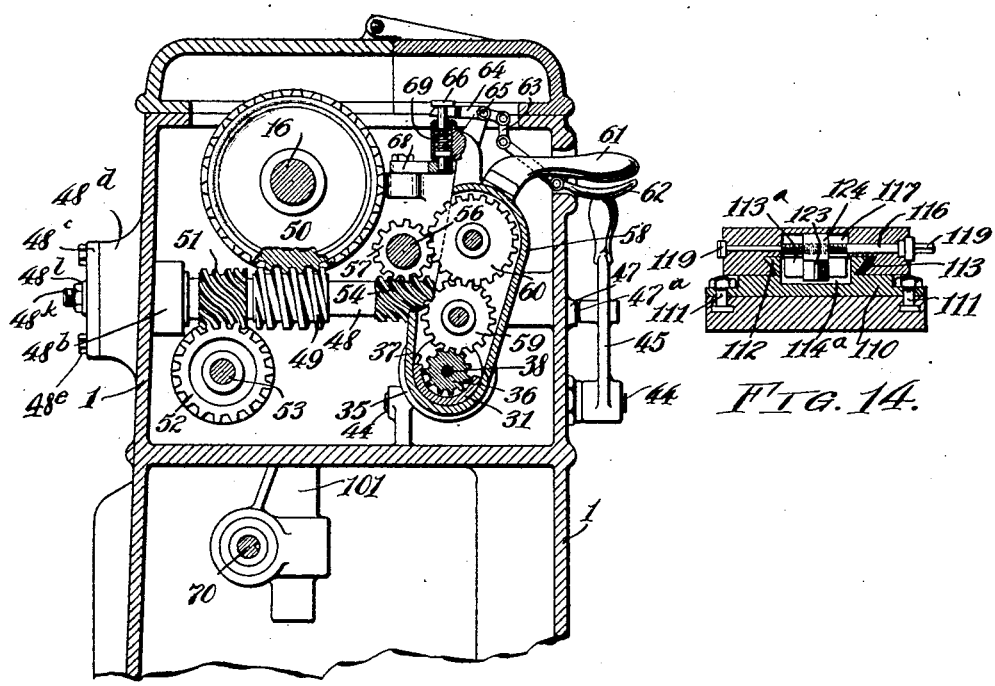
FIG. 7.
FIG. 14.
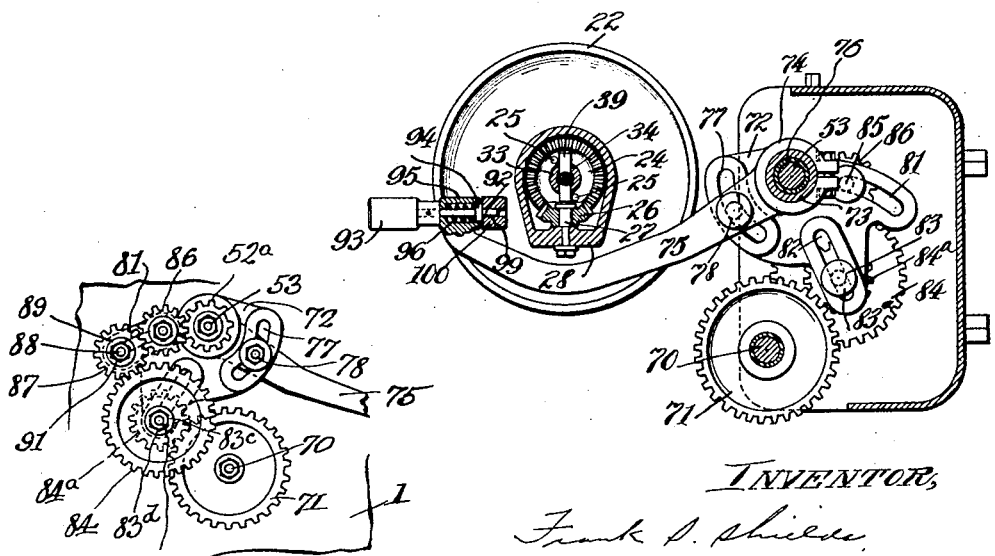
FIG. 8.
FIG. 10.

F. S. SHIELDS.
RELIEVING MACHINE.
APPLICATION FILED JAN. 10, 1917.
1,396,292.
Patented Nov. 8, 1921.
5 SHEETS—SHEET 5.
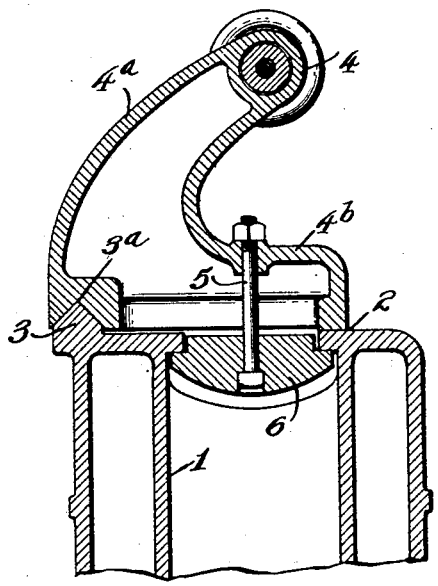
FIG. 11.
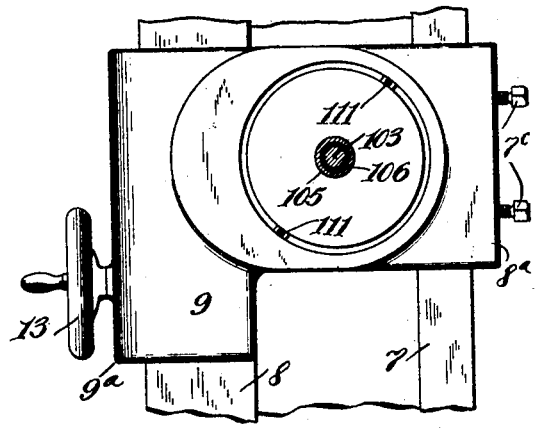
FIG. 12.
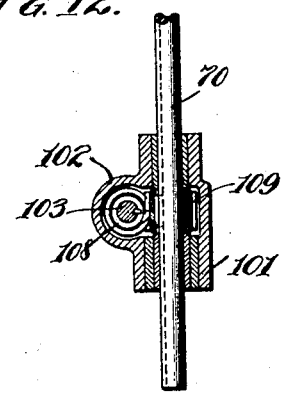
FIG. 13.
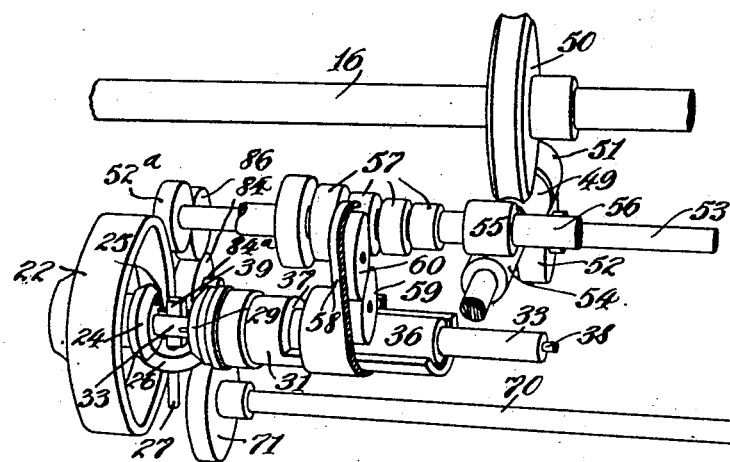
FIG. 15.
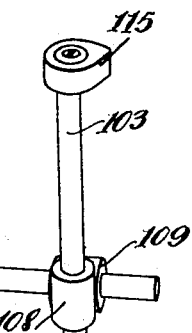
INVENTOR,
Frank S. Shields.
BY Hull, Smith, Brock & West.
ATT'YS.

UNITED STATES PATENT OFFICE.

FRANK S. SHIELDS, OF EAST CLEVELAND, OHIO, ASSIGNOR, BY MESNE ASSIGNMENTS, TO THE CLARK & MESKER MILLING MACHINE COMPANY, OF CLEVELAND, OHIO, A CORPORATION OF OHIO.

RELIEVING-MACHINE.

1,396,292.     Specification of Letters Patent.     Patented Nov. 8, 1921.

Application filed January 10, 1917. Serial No. 141,532.

*To all whom it may concern:*

Be it known that I, FRANK S. SHIELDS, a citizen of the United States, residing at East Cleveland, in the county of Cuyahoga and State of Ohio, have invented a certain new and useful Improvement in Relieving-Machines, of which the following is a full, clear, and exact description, reference being had to the accompanying drawings.

This invention relates to automatic machines of the type wherein a tool is reciprocated toward and from the work, and more particularly to machines designed for the relieving of form cutters. Among the general objects of the invention are to provide a machine of this character wherein the tool may be operated from either side of the work spindle and may be adjusted at any desired angle with reference to the work; to provide, in machines of this character, new and improved means whereby the work spindle may be conveniently driven and the drive thereof reversed; new and improved means for operating the work spindle and the tool-operating spindle; new and improved means for operating the tool from the last mentioned spindle; new and improved means for mounting, operating and adjusting the tool; and new and improved means for mounting and supporting the carriage, the tail stock, and the tool spindle—the whole construction and arrangement producing a machine of the character referred to which is more efficient than any others with which I am acquainted and wherein this efficiency is secured in and through a comparatively simple and inexpensive construction. Further and more limited objects of the invention will be explained at length in the specification and will be realized in and through the combinations of elements embodied in the claims hereto annexed.

Figure 1:
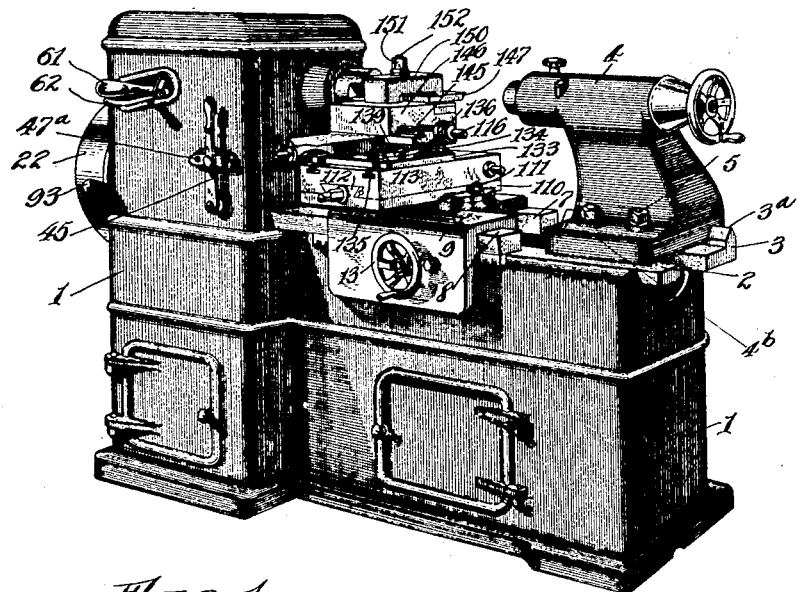
Figure 2:
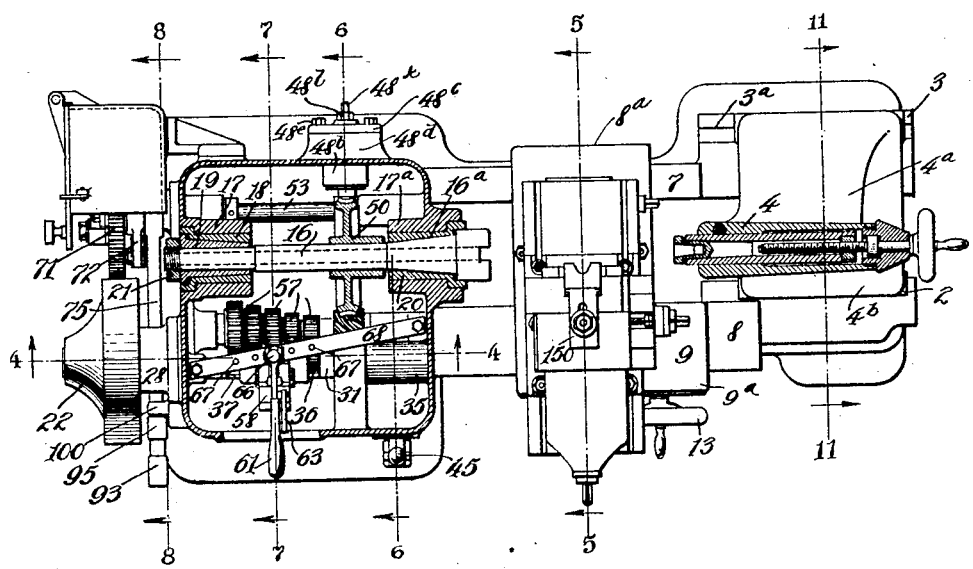

In the drawings forming part hereof, Figure 1 represents a perspective view of a complete machine constructed in accordance with my invention; Fig. 2 a sectional plan view, the section being taken through the work spindle and showing the latter in elevation; Fig. 3 an elevation of the machine, the elevation being of the left-hand end of the machine shown in Fig. 1; Figs. 4, 5, 6, 7, and 8 sectional details corresponding respectively to the lines 4—4, 5—5, 6—6, 7—7, and 8—8 of Fig. 2; Fig. 9 a sectional detail corresponding to the line 9—9 of Fig. 5; Fig. 10 a sectional detail corresponding to the line 10—10 of Fig. 5; Fig. 11 a sectional detail corresponding to the line 11—11 of Fig. 2; Figs. 12, 13, and 14 are sectional details corresponding respectively to the lines 12—12, 13—13, and 14—14 of Fig. 5, looking in the direction of the arrows; Fig. 15 a diagrammatic perspective view of the driving connections between the pulley and the work and tool-operating spindles; and Fig. 16 a detail in elevation of the driving connections between the countershaft and the shaft which operates the cam spindle.

The machine illustrated and described herein comprises generally a source of power, as a pulley, a main shaft, and means whereby the latter may be driven in reverse directions from the pulley; a change speed shaft, with means for driving the same from the main shaft; a counter shaft driven by the change-speed shaft; a second countershaft driven by the first countershaft, a work spindle, and a third countershaft driven by the second countershaft; a cam shaft, and driving connections between the last mentioned countershaft and said cam shaft whereby the cam shaft may be driven positively and in unison with the spindle and whereby the driving connections between the spindle and the cam shaft may be temporarily broken, if desired, for the purpose of properly timing the movements of the tool with reference to the work; a cam spindle driven by the cam shaft and anchored against rocking movement; tool-carrying mechanism operable variable distances through a pawl which coöperates with the cam on the cam spindle, the tool-carrying mechanism being so mounted and adjustable as to accommodate the tool for varying diameters of work and to permit the tool to operate upon the work from either side of the work spindle and at any desired angle; together with certain details of construction as to shaft mountings and carriage and tail stock mountings as will coöperate in securing the efficiency of operation referred to hereinbefore.

Describing by reference characters the various parts illustrated herein, 1 denotes generally the combined main frame and housing of the machine, said frame having a bed provided with a pair of slideways 2 and 3 whereon the tail stock is mounted. The tail stock comprises a sleeve 4 and a bracket 4ª which is offset laterally in a direction to take the thrust ordinarily imposed thereupon. The base 4ᵇ of the bracket is secured in various adjusted positions upon these slideways by means of bolts 5 connected to a clamp 6 within the housing and engaging the bottoms of the slideways. The slideway 3 is provided with a beveled rib providing a guide projection 3ª extending longitudinally thereof and adapted to fit within a correspondingly shaped recess in the base beneath and at the outer side of the offset bracket. The construction comprising the parts 2–6 inclusive provides an efficient and economical mounting for the tail stock and one wherein a firm lateral brace is opposed to the thrust exerted by the tool in the great bulk of the operations performed by the machine.

Mounted upon the bed are the slideways 7 and 8, the last mentioned slideways supporting the carriage 9 and its apron 9ª. The slideway 8 is dovetailed at one side thereof and engages with such side the side of a correspondingly shaped slot in the bottom of the carriage, there being a gib 9ᵇ interposed between the opposite side of the slideway and the corresponding sidewall of the slot, said gib being retained in place by a screw 9ᶜ. The carriage is adjustable along the slideways by means of the shaft 10 having the pinion 11 thereon meshing with a rack 12, the shaft being provided with the hand wheel 13. The carriage is provided with one or more clamps 14 connected to the depending skirt 7ª of the carriage opposite the apron 9ª and engaging beneath the flange 7, there being a bolt 15 for each of said clamps. Between the outer side of the slideway 7 and the corresponding side of the skirt, there is interposed a gib 7ᵇ, said gib being held in place by a screw 7ᶜ. It will be noted that the gibs 9ᵇ and 7ᵇ are each somewhat wider than the overhang of the dovetail of the slideway 8. This enables me to make the apron 9ª integral with the carriage 9 since, in assembling, the carriage may be placed upon its slideways and then positioned by inserting the gibs and applying the clamps, while, in dis-assembling, it is necessary only to remove the clamps and gibs and shift the carriage laterally a distance to clear the dovetail, whereupon it may be lifted off the slideways. Set screws 7ᶜ serve to clamp the carriage in its various adjusted positions upon the slideways.

Opposed to the tail stock is the work spindle 16—see Fig. 2. This spindle is mounted in inwardly projecting bearings 17, 17ª carried by the frame or housing, the bearing 17 having there-within a tapered steel bushing 18 coöperating with the reversely tapered bronze bushing 19. The opposite or work-facing end of the spindle is tapered, as shown at 16ª, and this tapered end is mounted within a bronze bushing 20. The spindle may be secured in place and be adjusted to compensate for wear by means of a nut 21 on the outer end thereof. The construction described provides an extremely efficient means for supporting the spindle and for permitting it to be removed and to be adjusted for wear as occasion may require.

22 denotes a pulley to which power is applied for driving the machine. This pulley has rigid therewith a short sleeve 23 having a bevel gear 24 at the inner end thereof, said gear being provided with a pair of driving pins 25. This gear meshes with a bevel pinion 26 on the stud shaft 27 mounted within a suitable bearing 28 carried by the frame housing. The bevel pinion 26 meshes with a bevel gear 29 having a sleeve 30 mounted within a bearing sleeve 31 carried by the housing. The gear 29 is provided with a pair of driving pins 32.

Within the sleeves 23 and 30 is a hollow main driving shaft 33, said shaft having a transverse slot 34 therethrough (see Fig. 4) within the space between the gears 24 and 29. The bearing sleeve 31 projects within the housing and is supported at its inner end by a split bearing 35. The shaft 33 extends through the sleeve 30 and is mounted within the bearing sleeve 31, being provided with a long spur gear 36, the bearing sleeve being provided with a segmental slot 37 in the upper portion thereof. Mounted within the shaft 33 is a rod 38, said rod having a driving block 39 thereon which extends transversely of the slot 34, being of less width than said slot and arranged to have its opposite ends engage between the respective pairs of pins 25 and 32. For the purpose of moving the block into driving engagement with either set of pins, the rod 38 is provided with a collar 40 having flanges 41 adapted to receive therebetween a pair of pins 42 carried by the opposite arms 43 of a fork which is rigidly connected to a rock shaft 44 having an operating lever 45 connected thereto, the lever being provided with a spring-pressed pawl 46 which is adapted to be projected into either one of a pair of coöperating recesses 47ª on a block 47 carried by the housing—see Figs. 1, 4 and 6. The construction including the parts 22–47 inclusive provides an efficient, economical and convenient means whereby the drive of the work spindle may be reversed as occasion may require.

The rotation of the shaft 33 is transmitted, through a series of tumbler gears and a countershaft to a common countershaft through which the work spindle and the tool-operating spindle may be driven positively and in unison. The shaft which drives the work spindle 16 is indicated at 48—see Fig. 7—and is provided with a worm 49 meshing with a worm gear 50 on the spindle 16 and with a spiral gear 51 meshing with a spiral gear 52 on a countershaft 53 from which the tool-operating shaft is driven through a series of gears in a manner to be described hereinafter. The shaft 48 is also provided with a spiral gear 54 meshing with a like gear 55 on the change-speed shaft 56. The change-speed shaft 56 has thereon gears 57, five such gears being shown (see Fig. 2) and is driven from the shaft 33 by any one of the gears 57 through a tumbler comprising a pair of gears mounted in a frame 58 which is sleeved upon the bearing 31 and is movable longitudinally thereof. The frame 58 has mounted therein the intermeshing gears 59 and 60, the gear 59 meshing with the gear 36 on the shaft 33. The frame 58 is provided with an operating handle 61 projecting through the housing in convenient position to be grasped by the operator. 62 denotes a lever which is pivotally connected to the handle 61 and having its outer end in a convenient grasping relation to the handle 61. At its inner end it is connected to one end of a link 63 the opposite end whereof is connected to one arm of a lever 64, pivoted at 65, the opposite arm being forked and receiving therewithin the stem 66 of a headed detent pawl, the lower end whereof will normally be held in locking engagement with any one of a series of apertures 67 in a bar 68 by means of a spring 69. It will be evident that, by grasping the handle 61 and the cooperating part of the lever 62, the detent pawl may be unlocked from the bar 68 and the top of the tumbler frame 58 may then be rocked outwardly, thereby disengaging the gear 60 from its corresponding gear 57, whereupon the tumbler frame may be reciprocated along the bearing 31 until the proper gear 57 is in operative relation to the gear 60. The tumbler frame may then be rocked inwardly, bringing the gear 60 into mesh with the appropriate gear 57, the pawl serving to lock the tumbler in this new position. Through the spiral gear 55, the rotation of the shaft 56 is transmitted to the shaft 48 in the manner hereinbefore described.

The shaft 48 is journaled in a bearing $48^a$ preferably cast with and projecting inwardly from one side of the housing 1—see Fig. 6—the other end being mounted in a thrust bearing comprising a cupped sleeve $48^b$ having a flanged cap $48^c$ the flanges whereof are adapted to abut against a boss $48^d$ carried by the housing, the flange affording a means whereby the sleeve may be detachably secured to the housing, as by means of bolts $48^e$. Within this sleeve there is mounted a cupped bushing $48^f$ and within the bushing $48^f$ there is mounted a cylindrical bushing $48^g$ which receives the end of the shaft 48 therewithin. The inner end of the cupped bushing $48^f$ engages an antifriction thrust bearing $48^h$ surrounding the shaft 48 and bearing against the gear 51. A similar thrust bearing $48^i$ is interposed between the gear 54 and the bearing $48^a$. By means of a screw bolt $48^k$ and a nut $48^l$ thereon, the bushing $48^f$ may be adjusted to take up the end thrust on the shaft. The parts $48^a$—$48^l$ inclusive provide also a convenient means whereby the shaft 48 may be assembled and disassembled as occasion may require.

Beneath the shaft 53 there is mounted a shaft 70 for operating the tool or cam spindle, said shaft having a gear 71 thereon, whereby it may be driven from the gear 52 through the construction to be described—see Figs. 3, 7 and 8. 72 denotes a frame having a sleeve 73 whereby it is adjustably mounted upon the shaft 53, there being a bushing 76 interposed between the sleeve and the shaft. 74 denotes the sleeve of a lever arm 75, the sleeve 74 being mounted on the sleeve 73. The frame 72 is provided with a segmental slot 77 which affords a means for adjustably connecting the arm 75 thereto, the adjustable connection being conveniently afforded by means of a headed bolt 78 projecting from the arm into and through the slot, the bolt having thereon a washer 79 adapted to bear against the side of the slot which is opposite the lever, there being a nut 80 for setting up the washer. The frame 72 is provided with a pair of slots 81, 82, the latter slot extending radially with respect to the shaft 76. The slot 82 has adjustably mounted therein a bolt carrying a gear. The bolt is indicated at 83, said bolt extending through the slot and being provided at one end thereof with a head $83^a$ and a washer $83^b$ bearing against a flattened face of the slot, the bolt having a nut $83^c$ on its opposite end, the nut serving to secure the bolt in place and to clamp upon the bolt a bushing $83^d$ on which there is mounted a double gear 84, $84^a$. Mounted on a stud 85 carried by the frame is a gear or pinion 86 which meshes with the gear 84 and is adapted to mesh with the gear $52^a$ on the shaft 53 thereby to drive the cam shaft from such shaft 53. In order to avoid reversing the drive of the cam shaft and the cam spindle when the main shaft and work spindle are reversed, an intermediate gear 87 may be inserted between the gear or pinion 86 and the gear 84. This intermediate gear will then be supported in the slot 81 by means of a bolt 88 having a head 89 adapted to engage one side of said slot, said bolt having a nut 91 thereon.

The arm 75 extends across the left-hand end of the housing, between the pulley 22 and the said housing, and is provided with a detent pawl 92 connected to a handle 93 and having a head 94 mounted within a casing 95, there being a spring 96 which tends to thrust one end 98 of the pawl into a locking aperture 99 in a locking plate 100 carried by the housing. The pinion 86 is adapted to mesh with the gear 52ᵃ on the shaft 53 and with the gear 87. Through the pinion 86, the gear 87, and the pinion 84ᵃ (meshing with the gear 71), the shaft 70 may be driven from the shaft 53. Furthermore, this arrangement provides an extremely convenient means whereby the speed of the shaft 70 with reference to the shaft 53, and hence with reference to the spindle 15, may be conveniently varied by merely changing the sizes of the gears 84 and 86. This enables me to give as many reciprocations of the tool with reference to the work on the spindle as may be desirable to suit the particular circumstances of any case. It also enables me to accurately time the movement of the tool with reference to the work, to prevent the tool from digging into the work, and to accomplish this result in an extremely convenient manner, it being noted that the arm 75 is located where it may be grasped by the workman while he is actually inspecting the operation of the tool. Furthermore, while the speed of the shaft 56 is much greater than that of the spindle 16, the speed of the shaft 52 is only about half the speed of the shaft 56. This makes it very convenient to obtain a change of speed in the shaft 70 without taking much power from the drive shaft. The adjustable connection between the arm 75 and the frame and the manner of mounting the gears in said frame enable me to change the gear ratio and to compensate for the reversal of the main shaft and of the countershaft 53 without affecting the locking of the gear frame in driving relation to the said countershaft and the cam shaft.

The shaft 70 is located a considerable distance below the spindle 16. At its inner end it is supported in a bearing 101 projecting from a housing 102 which forms a bearing for the tool-operating spindle—shown specifically as a cam spindle—the housing depending from the carriage—see Figs. 5, 7 and 13. Within this housing there is mounted the cam spindle 103. The lower end of the cam spindle is provided with a bushing 104 while the intermediate portion is provided with a bushing 104ᵃ in the housing 102, the upper end of the shaft having bushings 105, 106 within recesses in the top of the carriage and the bottom of the slide base which recesses form a continuation of the interior of the housing, the last mentioned bushing having a flange 107 whereby it is supported from the slide base, to be described hereinafter. Near but above the lower end of the shaft 103 and between the bushings 104, 104ᵃ, there is provided a spiral gear 108 meshing with a similar gear 109 slidably keyed upon the shaft 70 whereby a driving connection between the gears will be maintained notwithstanding the shifting of the carriage. It will be noted that, by the arrangement of the shaft 70 and by the manner of mounting the cam spindle, the spindle is provided with two widely spaced end bearings and the drive is imparted to the spindle intermediate of its ends. The spindle, being firmly anchored at both ends and being driven intermediate of its ends, is operated smoothly and without any rocking movement whatever.

110 denotes a slide base which is swiveled upon the carriage 9, the slide base being provided with depending T headed projections 111 mounted in a correspondingly shaped circular track or guide in the carriage and concentric with the axis of the shaft 103. The slide base is provided with a dovetailed guide projection 112 which projects into a correspondingly shaped guide recess in the slide 113. This dove-tailed guide projection is recessed, as shown at 114 and 114ᵃ (see Figs. 5, 10 and 14) and, intermediate the top and bottom of said projection, the shaft 103 is provided with the cam 115. 116 denotes a bolt which extends through the depending sides of the slide 113 and through the nut 124 above the projection 112, the slide having a recess 117 above such projection and the portion of the bolt which extends across the recess being threaded and the bolt being provided at one end with a head 118 and at the opposite end with a squared extension 119. 120 denotes a stud carried by the slide base and extended into the recess 114 at one side of the cam spindle 103. On this stud there is pivoted a pawl 121 having the inclined operating surface 122 which is adapted to be engaged by the cam, the direction of rotation of the cam being indicated by the arrow in Fig. 10. One face of the pawl bears against a narrow projection 123 carried by the nut 124 mounted on the threaded portion of the bolt 116. The opposite side of the nut bears against an abutment 113ᵃ depending from the slide 113 into the recess 114ᵃ and providing a rigid driving engagement between the pawl and the slide. A spring 125, which is located within the recess 114ᵃ, is connected at one end to a pin 126 carried by a yoke 127 supported by a pair of bolts 128 depending from the slide 113 into said recess, the opposite end of the spring being connected to a pin 129 carried by a yoke 130 at the inner end of a bolt 131 projecting through the end of the dove-tail guide and having threaded thereon a nut 132 having a sleeve extension inclosing and protecting the threaded end of the bolt. By the construction just described, it will be evident that the rotation of the shaft 103 is transmitted through the cam 115, pawl 121, nut 124 and bolt 116 to the slide 113, the slide being moved in the reverse direction by the spring 125; also that the throw of the slide 113 may be conveniently varied by merely rotating the bolt 116 to move the nut 124 there-along a greater or less distance from the pivot of the pawl 121. Furthermore, the sleeve 132 provides a convenient means for varying the tension of the spring 125.

On top of the slide 113 there is mounted a block 133 which is adjustable longitudinally of said slide, as by means of T headed bolts 134 projecting downwardly from the said block and mounted within corresponding T slots 135 in said slide—see Fig. 1. This adjustment is to accommodate the tool to different diameters of work. The block 133 is provided with the lower member 136 of a turn table, the member 136 having a circular T slot 137 therein for the reception of T headed bolts 138 depending from the upper turntable member 139—see Figs. 1 and 5. The upper turntable member has a dove-tailed guide projection 140 extending into a correspondingly shaped slot in a slide 141, said slide having a downwardly extending lug 142 providing a bearing for a bolt 143 the inner end whereof is threaded into the dove tailed projection 140, as indicated at 144. By rotating the bolt 143 a fine adjustment of the tool toward and from the work may be secured.

Rigid with the slide 141 is a dove-tailed guide projection 145 extending transversely of said slide and forming a guide for the slide 146 which carried the tool 147. This tool rests upon a pair of relatively adjustable blocks 148, 149—see Fig. 9—mounted in a recess at one side of the slide 146. These blocks have their proximate faces inclined and these inclined faces are provided with interengaging serrations 148$^a$, 149$^a$ respectively. The plates having been adjusted to support the tool at the desired height, the tool is then secured in place by means of a clamp 150 one leg whereof engages the top of the slide 146 and the opposite leg whereof projects into a notch 147$^a$ in the tool 147, the clamp being fastened by means of a nut 151 threaded on a stud 152 projecting upwardly from the slide. The slides 141 and 146 are for the purpose of giving the final adjustment of the tool relative to the work after the carriage has been clamped. By rotating the threaded bolt 143, the tool may be moved toward and from the axis of the spindle 16, while by rotating the threaded bolt 153, a similar adjustment may be given the tool at right angles to the former adjustment, dials 154 being provided whereby the amount of adjustment may be determined within one-thousandth of an inch.

In order to provide a support for the overhanging slides 113 and 141, the turntable on the top of the carriage 9 and the coöperating bottom surface of the slide base thereabove are extended in the direction of such overhang: see Fig. 12.

Among the important advantages secured by my invention are the following:—

(a.) Through the reversible drive and the manner of mounting the tool, the tool may be operated from either side of the spindle and may be set at any angle up to 180° to the spindle, thus enabling the machine to relieve either right or left hand cutters and to secure both side and end relief.

(b.) Through the manner of driving the work spindle and the cam or tool-operating shaft, it will be noted that the spindle is driven first through the shaft 48 and that the cam shaft is then driven from the shaft through the train of gears described herein. In case the work should stop or slow down, then it will follow that the cam shaft must also stop or slow down. This prevents the tool from digging into the work—an extremely important consideration in the case of gang work. In all other constructions with which I am familiar, should the spindle stop or lag, the tool, driven from the cam shaft and cam spindle, will gain on the work spindle, with the result that the tool will dig into the work. This cannot occur in the operation of my machine.

(c.) The drive connections employed in my machine enable the speed of the cam or tool-operating shaft to be conveniently varied as desired and to drive the cam shaft without taking much power from the drive shaft.

(d.) The drive connections including the arm 75 and the train of gears associated therewith is important in that it enables the operator to reverse the work spindle without reversing the tool-operating spindle and to break the drive between the work spindle and the tool-operating or cam shaft in order to properly time the movement of the tool with reference to the work. In all other machines with which I am familiar the operator must manually adjust the tool-operating shaft or manually change some of the gears in order to secure this result. In the machine described herein, this result is secured by merely rocking the lever arm 75, and the parts are so arranged that the operator can inspect the work and the tool and readjust the tool drive accordingly by manipulation of the lever arm.

(e.) By the driving connections employed herein, the cam spindle is anchored and driven in such manner that it runs smoothly and without any rocking.

(f.) It will be observed that the cam is in the plane of movement of the slide which it operates; hence there is no tendency to tilt and no lost motion between the cam and its slide, the cam being located between the top and bottom guides for the slide. Furthermore, the cam and the working parts associated therewith, are within a recess (114ª) which is filled with oil, whereby all of these working parts run in oil.

(g.) The manner of transmitting motion from the cam to the slide thereabove enables me to obtain a variable throw of the slide with a single cam. A field wherein this is of marked importance is in the fluting of cutters, such as hobs.

(h.) The manner of supporting and adjusting the various slides of the tool carriage enables the tool to be operated from any angle and to be adjusted in an extremely simple but efficient manner.

(i.) The mounting of the tail-stock is such as to enable it efficiently to resist the lateral thrust imparted to it by the movement of the tool.

(j.) The carriage mounting enables me to use a carriage having an integral apron and to apply the carriage to and remove it from its slideways in a very convenient manner.

Having thus described my invention, what I claim is:—

1. In a machine of the character described, the combination, with a drive shaft, of a cam spindle and means for driving the same from the said shaft, a cam on the cam spindle, a pawl pivoted adjacent to the cam spindle and adapted to be moved in one direction by the cam, a spring for moving the pawl in the opposite direction, a slide base, a slide on said base having a movable member which is adapted to be engaged by said pawl at varying distances from the axis of oscillation of said pawl, said slide having spaced guideways between which the cam and the pawl operate, a carriage rotatably supporting said slide base, a second slide rotatably mounted on the first slide, a slide carried by the last mentioned slide and adjustable transversely thereof, means for clamping a tool upon the last mentioned slide, and an adjustable support for said tool carried by the last mentioned slide and supporting the part of the tool which is opposite the clamping means.

2. In a machine of the character described, the combination, with a drive shaft, of a cam shaft, connections for driving said cam shaft from said drive shaft, a cam spindle having a gear intermediate the ends thereof driven by the cam shaft, a cam on the cam spindle, a pawl pivoted adjacent to the cam spindle and adapted to be moved in one direction by the cam, a spring for moving the pawl in the opposite direction, a slide base, a slide on said base having a movable member which is adapted to be engaged by said pawl at varying distances from the axis of oscillation of said pawl, said slide having spaced guideways between which the cam and the pawl operate, a carriage rotatably supporting said slide base, a block adjustably mounted on said slide, a slide swiveled upon said block, a slide carried by the last mentioned slide and adjustable transversely thereof, means for clamping a tool upon the last mentioned slide, and an adjustable support for said tool carried by the last mentioned slide and supporting the part of the tool which is opposite the clamping means.

3. In a machine of the character described, the combination with a drive shaft, of a cam shaft, connections for driving the said cam shaft from the drive shaft, a cam spindle having a gear intermediate the ends thereof driven by the cam shaft, a cam on the cam spindle, a pawl pivoted adjacent to the cam spindle and adapted to be moved in one direction by the cam, a spring for moving the pawl in the opposite direction, a slide base, a slide on said base having a movable member which is adapted to be engaged by said pawl at varying distances from the axis of oscillation of said pawl, said slide having spaced guideways between which the cam and the pawl operate, a carriage rotatably supporting said slide base, a second slide rotatably mounted on the first slide, a slide carried by the last mentioned slide and adjustable transversely thereof, means for clamping a tool upon the last mentioned slide, and an adjustable support for said tool carried by the last mentioned slide and supporting the part of the tool which is opposite the clamping means.

4. In a machine of the character described, the combination, with a slide and a swiveled support therefor, of a tool-carrying slide swiveled upon the first mentioned slide, a work spindle in operative relation to the tool-carrying slide, a shaft, means for driving the shaft in reverse directions, driving connections between said shaft and said spindle, and reversible driving connections between said shaft and the first mentioned slide.

5. In a machine of the character described, the combination of a bed, a carriage movable therealong, a slide base swiveled upon said carriage, a slide upon said base, a block adjustable upon said slide, a slide swiveled on said block, a slide on the second slide, a tool carried by the third slide, a work spindle in operative relation to the tool carrying slide, a shaft, means for driving the shaft in reverse directions, driving connections between said shaft and said spindle, and reversible driving connections between said shaft and the first mentioned slide.

6. In a machine of the character described, the combination of a bed, a carriage movable therealong, a slide base swiveled upon said carriage, a slide upon said base, a block adjustable upon said slide, a slide swiveled on said block, a slide on the second slide, a tool carried by the third slide, a work spindle in operative relation to the tool carrying slide, a shaft, means for the shaft, and driving connections between said shaft and said spindle and between said shaft and the first mentioned slide for driving said spindle and such first-mentioned slide at proportional speeds.

7. In a machine of the character described, the combination of a bed, a carriage movable therealong, a slide base swiveled upon said carriage, a slide mounted upon said base, a block adjustably mounted upon said slide, a slide swiveled on said block, a slide base carried by the second slide, a slide upon the last mentioned base, a tool, means for adjustably securing the same to the last mentioned slide, a work spindle, a change speed shaft, a countershaft driven by the change speed shaft and driving said spindle, a main shaft, means for driving the same in reverse directions, connections for driving the change speed shaft from the main shaft, and connections for driving the first mentioned slide in reverse directions from the said countershaft.

8. In a machine of the character described, the combination of a bed, a carriage movable therealong, a slide base swiveled upon said carriage, a slide mounted upon said base, a block adjustably mounted upon said slide, a slide swiveled on said block, a slide base carried by the second slide, a slide upon the last mentioned base, a tool, means for adjustably securing the same to the last mentioned slide, a work spindle, a change speed shaft, a countershaft driven by the change speed shaft and driving said spindle, a main shaft, means for driving the same, connections for driving the change speed shaft from the main shaft, and change speed connections for driving the first mentioned slide from the said countershaft.

9. In a machine of the character described, the combination, with a work spindle and a tool support, of a main shaft, driving connections between the main shaft and the work spindle, and driving connections between the main shaft and the tool support, the last mentioned driving connections including a pair of spaced shafts, a power transmitting device movable into and out of operative relation to the last mentioned shafts, and a second power transmitting device movable into and out of operative relation to the first device and one of such last mentioned shafts.

10. In a machine of the character described, the combination, with a work spindle and a tool support, of a main shaft, driving connections between the main shaft and the work spindle, and driving connections between the main shaft and the tool support, the last mentioned driving connections including a pair of spaced shafts each having a gear thereon, a frame rotatable about the axis of one of said shafts and having a gear thereon adapted to be brought into and out of driving relation with the gear on the other of said shafts, and means for locking said frame in position to establish the driving connection between the said shafts.

11. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts and having one or more gears adapted to transmit the motion of the driving shaft to the driven shaft and a movably supported gear adapted to reverse the rotation of the driven shaft, and means for locking said frame in position to establish the driving connection between said shafts.

12. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts and having one or more gears adapted to transmit the motion of the driving shaft to the driven shaft, and means for locking the frame in position to establish the driving connection between said shafts.

13. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts and having one or more gears adapted to transmit the motion of the driving shaft to the driven shaft, and means for automatically locking the frame in position to establish the driving connection between said shafts.

14. In a machine of the character described, the combination, with a work spindle and a tool support, of means for driving the same in unison, and means for changing the driving relation between the tool-support and the spindle, the last mentioned means comprising a pair of spaced shafts each having a gear thereon with means for driving one of said shafts, a frame rotatable about the axis of one of said shafts and having one or more gears adapted to transmit the motion of the driving shaft to the driven shaft, an operating arm adjustably connected to said frame, and means for automatically locking said arm in position to establish the driving connection between said shafts.

15. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts and having one or more gears adapted to transmit the motion of the driving shaft to the driven shaft, and an operating arm adjustably connected to said frame.

16. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts, a gear mounted on said frame and adapted to mesh with the gear on the last mentioned shaft, a second gear mounted on said frame and adapted to mesh with the first mentioned gear, an arm rotatable about the axis of said shaft, an adjustable connection between the arm and the frame, and means coöperating with the arm to lock the frame in position to establish a driving connection between said shafts.

17. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts and having a pair of gear supports, a gear mounted on one of said supports and adapted to mesh with the gear on the last mentioned shaft, a gear mounted on the other support and adapted to mesh with the first mentioned gear on said frame, an operating arm for said frame, an adjustable connection between the arm and the frame, and means for locking the frame in position to establish a driving connection between said shafts.

18. In a machine of the character described, the combination, with a work spindle and a tool support, of means for driving the same in unison, and means for changing the driving relation between the tool support and the spindle, the last mentioned means comprising a pair of spaced shafts each having a gear thereon with means for driving one of said shafts, a frame rotatable about the axis of one of said shafts, a pair of change speed gears carried by said frame, one of the pair of gears being adapted to mesh with the gear on the last mentioned shaft and the other gear being adapted to mesh with the gear on the other shaft, one of said pair of gears being adjustably supported in said frame, an operating arm adjustably connected to said frame, means for locking said arm in position to maintain the driving connection between the said shafts through the gears of said frame, and a third gear on said frame movable into and out of driving relation to another gear thereon, thereby to reverse the drive of the driven shaft.

19. In a machine of the character described, the combination, with a shaft and means for driving the same in reverse directions, of a work spindle, a tool support, driving connections between the said shaft and the work spindle whereby the spindle will be driven in accordance with the direction of rotation of said shaft, and reversible driving connections between said shaft and the tool support whereby the latter may be driven in the same direction notwithstanding the reversal of the said shaft.

20. In a machine of the character described, the combination, with a work spindle and a tool support, of means for driving said spindle and support, said means comprising a drive shaft, a shaft having change-speed gears thereon, connections for driving the second shaft from the drive shaft through any one of the gears on the second shaft, a countershaft driven from the second shaft, driving connections between the countershaft and the spindle, a second countershaft driven from the first mentioned countershaft, a cam shaft, means whereby the cam shaft may be driven at varying speeds from the second countershaft, a cam spindle driven by the cam shaft, and connections for driving the tool support from the cam spindle.

21. In a machine of the character described, the combination, with a work spindle and a tool support, of means for driving said spindle and support, said means comprising a drive shaft, a shaft having change-speed gears thereon, connections for driving the second shaft from the drive shaft through any one of the gears on the second shaft, a countershaft driven from the second shaft, driving connections between the countershaft and the spindle, a second countershaft driven by the first countershaft, and means for driving the tool support at variable speeds from the second countershaft.

22. In a machine of the character described, the combination, with a work spindle, a carriage, and a tool support adjustably mounted on said carriage, of means for driving said spindle and said support, said means including a cam shaft spaced from the spindle and extending beneath the carriage, a cam spindle depending from the carriage and having a gear intermediate the ends thereof, bearings for the cam spindle on opposite sides of the gear thereon, a gear on the cam shaft meshing with the cam spindle gear, a cam on the upper end of the cam spindle, and means for preserving the driving connection between the cam shaft and the cam spindle in all adjusted positions of the carriage.

23. In a machine of the character described, the combination, with a spindle and a tool support, of means for driving said spindle and said tool support, said means including a cam shaft spaced from the spindle and extending beneath the tool support, a cam spindle having a gear intermediate the ends thereof, bearings for the cam spindle on opposite sides of the gear thereon, a gear on the cam shaft meshing with the cam spindle gear, and a cam on the upper end of the cam spindle.

24. In a machine of the character described, the combination, with a work spindle, a carriage, a slide base rotatably mounted on said carriage, a slide on said base and a tool support carried by said slide, of means for driving said spindle and said support, said means including a cam shaft spaced from the spindle and extending beneath the carriage, a bearing sleeve depending from the carriage, the axis of said sleeve being the axis of rotation of the slide base with respect to said carriage, the carriage and the slide base having alined bores providing an extension of the bearing sleeve, a cam spindle mounted in said bores and said bearing sleeve and having a gear intermediate the ends thereof, bushings in said sleeve on opposite sides of said gear and one or more bushings in the bores of said carriage and slide base, a gear on the cam shaft meshing with the cam spindle gear, a cam on the cam spindle, and means for preserving the driving connection between the cam shaft and the cam spindle in the adjusted positions of the carriage.

25. In a machine of the character described, the combination with a shaft and means for driving the same, of a work spindle, driving connections between said spindle and said shaft, a carriage, a slide base swiveled upon said carriage and overhanging the carriage at one side thereof, a slide on said base, a second slide swiveled upon the first mentioned slide and also overhanging such side of the base, a tool support movably mounted on the second slide, and driving connections between said shaft and the first mentioned slide, the interengaging surfaces of the carriage and of the slide base being extended in the direction of the overhang of such base and the slides thereabove.

In testimony whereof, I hereunto affix my signature.

FRANK S. SHIELDS.